United States Patent Office 2,862,771
Patented Dec. 2, 1958

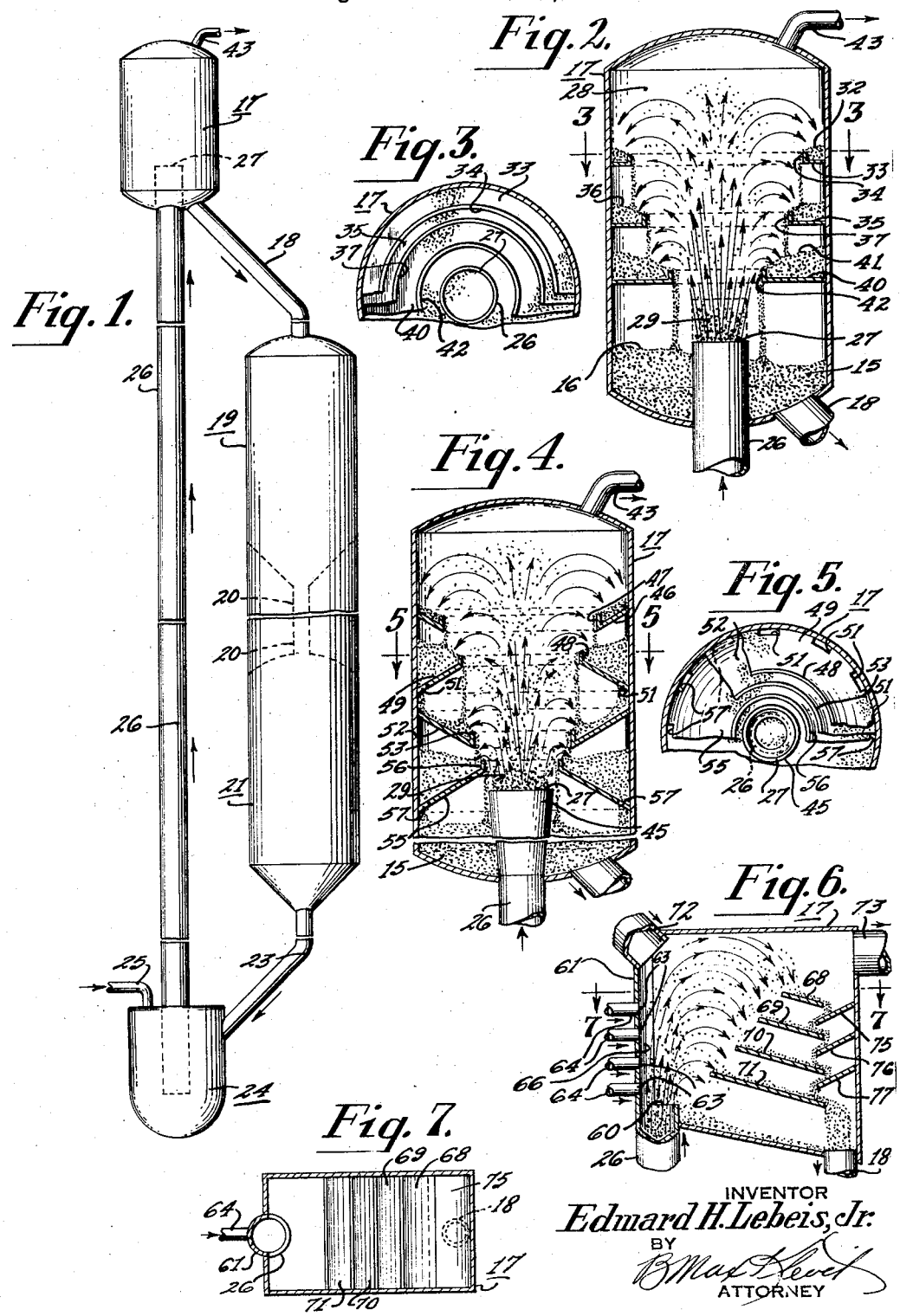

2,862,771

DISENGAGING SOLIDS FROM LIFT GAS

Edward H. Lebeis, Jr., Media, Pa., assignor to Houdry Process Corporation, Wilmington, Del., a corporation of Delaware Original application June 12, 1951, Serial No. 231,116. Divided and this application October 13, 1954, Serial No. 461,948

3 Claims. (Cl. 302—59)

This invention relates to a processing system wherein free-flowing particles, especially granules or pellets of relatively frangible, solid material such as contact materials used, for instance, in chemical treating operations are at least for the most part continuously moved through a substantially closed circuit which includes (a) a downflow pass, wherein the granular material travels through at least one processing zone in which it participates in a processing step, and (b) also an upflow pass, which receives the free-flowing solids from the downflow pass and wherein they are elevated at least usually by a pneumatic lift, and (c) a separating or disengaging zone above the upflow pass and into which the solids-fluid mixture emerging from the lift discharges for the solids to be separated from the fluid to return to the downflow pass, and wherein the separated solids, after having been raised an appreciable height until the momentum imparted to them by the lifting fluid is overcome by the pull of gravity, then fall usually a still greater distance on their return to the downflow pass and are thereby exposed to the danger of undesirable amount of attrition upon falling against previously fallen solids temporarily at rest or relatively so.

The invention involves a modification of the operation of such processing systems and of the method of handling such solids particularly in the separating or disengaging zone, whereby the falling granular solids are restrained against developing high enough velocity to result in disadvantageously high impact when the solids meet those which had fallen before them. Also included is the applicable improved apparatus.

The systems embracing the method and apparatus of the invention are more usually useful in such chemical operations where, for example, granular solids or pellets are relied on for heat exchange, to furnish or remove heat from a fluid, gas (whether single gas or mixture, a vapor, or gas-vapor mixture) or liquid, as heat for distillation or fractionation or cooling for condensations, or to supply heat to the fluid to cause chemical reaction, for example, in thermal cracking of petroleum or petroleum fractions, or to act as contact catalyst in various types of chemical reactions including cracking processes, or both to heat and act as a catalyst as in combined thermal and catalytic cracking. The method and apparatus of the invention are especially advantageously effective in these systems, in the downpass of which the granular solids travel as a downwardly moving, non-turbulent and relatively compact bed through the reactor zone, and then continue on in the circulation. The granular solids with which this invention is concerned are those having an average particle size of 14 mesh or larger, and include the typical cast pellets, spherical bead-form materials or other regular or irregular solid shapes generally in the size range of 2 to 5 mm. in their larger dimension.

While not necessarily restricted to any specific chemical treating operation, the invention conveniently can be described in relation to its inclusion in a system wherein such granular catalytic solids are re-circulated through a relatively closed cycle, passing downwardly as a non-turbulent bed (as just described) through a reaction zone and to and through a regeneration zone and from it to a pneumatic lift discharging into a disengager wherein the pull of gravity finally overcomes the momentum imparted to the solids as they left the exit end of the lift, and they then fall to the bottom of the disengager to return to the downpass to re-track the circuit just completed. Such a re-circulation system occurs in various installations of a petroleum cracking process currently operating in this country.

Figures 1 and 2 in "New Houdriflow Installations Employ Modified Design," pages 170–175 of the September 1950 issue (volume 29, No. 9) of "Petroleum Refiner" show such a closed cycle in a catalytic petroleum-cracking installation with a reactor above a regenerator from which the regenerated catalyst passes to a lower lift hopper and by a pneumatic (gas) lift is raised to the disengager (upper lift hopper), to be fed again on its downpass to the reactor, and so on through the cycle. Highly desirable economies are obtained by the advantage of gravity flow resulting from locating the reactor over the regenerator, and the upper lift hopper over the reactor. The accompanying extended heights of such installations necessitate raising the catalyst pellets or beads greater distances than were required by other and earlier installations. Pneumatic lifts have been found more efficient and economical in power requirements and subject to less maintenance expense than bucket elevators for such heights. It is not unusual for the granular catalyst to be raised in the range of about two hundred feet by the gas lift from the lower hopper to the upper hopper or disengager, and commonly a distance of at least one hundred and fifty feet, and quite generally higher.

The quantity of catalyst circulated ordinarily is not under about one hundred tons per hour and it is not unusual for the catalyst circulation rate to run at high as two hundred and fifty or three hundred tons per hour, and sometimes higher, as indicated by the "Petroleum Refiner" article. In elevating such quantities of catalyst in concentrations averaging about one to two pounds and at times more per cubic foot in lift pipes of practical diameter, the catalyst may reach an average velocity at the discharge or exit end of the lift of at least thirty and usually about forty feet per second or higher. The catalyst pellets emerging from the exit end of the lift at such velocities, unless suitable means are provided for deceleration, may be propelled as much as twenty, and often as much as or more than thirty, feet above the top of the lift before they begin to drop.

To enable the catalyst to travel in its downpass through the reactor in a sufficiently compact mass, it is necessary to maintain on the bottom of the disengager (or upper lift hopper) some depth of catalyst accumulation which can operate as a surge bed. When the level of the catalyst surge bed in the disengager hopper is relatively low, as will be the case in normal operation, the discharge end of the lift extends many feet above the top of the surge bed. Accordingly, the disengaged catalyst all too often will drop about thirty feet and more by the time it has completed its fall on contacting the top of the surge bed. Obviously, the impact on each individual pellet is considerable after such a fall, and accordingly, there is presented a real concern over the problem of the extent of attrition of the catalyst or other pellets or granules.

These and other problems encountered in disengaging or separating such granular solids from the solids-gas stream discharging from a pneumatic lift into what might be termed an otherwise hollow or empty disengaging zone or disengager are strikingly overcome by the method and applicable apparatus of the invention. By an empty or hollow disengaging zone or disengager is meant a disengager in whose disengaging zone there are no significant structures between the top surface of the catalyst, or other solid material, surge bed and the ceiling of the disengager, other than the extension of the lift pipe into the disengager.

In other words, in such a disengaging zone after the granular solids discharged from the lift have risen as far as they can until their momentum is overcome by the pull of gravity, they drop in free fall entirely uninterrupted until they reach the bottom of the disengaging zone. The bottom of the disengaging zone is considered the bottom of the disengager when no solids have accumulated on it or the top surface of the surge bed of solids accumulated on the bottom of the disengager.

Speaking broadly, the invention as to process involves the method of effectively reducing the maximum free fall velocity attainable by the descending granular solids by the end of their drop after disengagement from the lift fluid and thereby effectively reducing the force of their impact against the bottom of the disengaging zone, and likewise the possibility of attrition damage, which method comprises interrupting or breaking the fall of the disengaged granular solids at least once in their entire descent from the summit of their rise in the stream emerging from the lift till they reach the bottom of the disengaging zone. Expressed otherwise, the method of the invention involves interrupting the already initiated fall of the disengaged solids by temporarily stopping them on at least one non-vertical surface at an elevation intermediate the summit reached by them after their emergence from the lift and the discharge (or exit) end of the lift.

Any non-vertical surface at which the disengaged solids are temporarily stopped, briefly called a falling-solids-stopping surface, advantageously is located outside of the path of the emerging stream of granules discharged from the lift and at the same time within the path of the falling granular solids. If there is only one such falling-solids-stopping surface, then after the temporary interruption, the granular solids continue on in their descent to the bottom of the disengaging zone. However, for many installations present considerations indicate it to be advantageous to interrupt or break the fall of the solids by stopping them in sequence on a plurality or series of falling-solids-stopping surfaces each at a different level intermediate the top of the lift and the summit reached by the solids emerging from it. In this mode of the process of the invention, after temporary interruption of flow on the first falling-solids-stopping surface encountered by the falling solids, the solids drop off to the next lower one and after temporary interruption on it continue on similarly to each lower one in the series and finally drop off from the lowermost of them to the bottom of the disengager zone.

The various features and advantages of the method of the invention and of the practice of it as well as of the nature and operation of the apparatus of the invention can be more readily recognized and understood when described in relation to the accompanying drawings wherein: Figure 1 is a generalized representation in foreshortened elevation, of a catalytic hydrocarbon conversion (e. g. catalytic cracking) system, including a pneumatic lift feeding into a disengager internally equipped according to the apparatus of the invention and to enable the operation of the method of the invention as part of a continuous cycle involving circulation of catalyst granules or pellets; Figure 2 is a foreshortened vertical section through the disengager of Figure 1; Figure 3 is a partial horizontally transverse section along the line 3—3 of Figure 2 and looking in the direction of the arrows; Figure 4 is a foreshortened vertical section of a different modification of disengager; Figure 5 is a partial horizontally transverse section along the line 5—5 of Figure 4 and looking in the direction of the arrows; Figure 6 is a vertical section through a further and substantially different modification of disengager; and Figure 7 is a horizontally transverse section along the line 7—7 of Figure 6 and looking in the direction of the arrows.

In the system as represented in Figure 1, molded pellets or bead (e. g. spherical) catalyst 15 (see Figure 2) flows downwardly from the catalyst surge bed 16 at the bottom of the lift disengaging hopper (or disengaging chamber, or merely disengager) 17 by gravity through the reactor seal leg 18 into the reactor 19 and through it as a downwardly moving, compact, non-turbulent bed, then through the reactor- and kiln-connecting seal leg 20 into the regenerator kiln 21 and subsequently through the kiln outlet seal leg 23 into the lift engaging hopper 24 forming a bed therein. Lift gas entering the hopper 24 through the lift gas feed line 25 impels the catalyst from the bed of it in the hopper 24 into the lift pipe 26 through which the catalyst is elevated as a mixture of solid pellets in lift gas (or solids-fluid mixture or solids-gas mixture) to the discharge or exit end 27 of the lift pipe 26 into the disengaging zone 28 of the disengager 17, for the solid catalyst 15 to be disengaged or separated from the lift gas to descend in stages ultimately to join accumulated earlier separated catalyst in the catalyst surge bed 16 in the lowermost portion of the disengaging hopper 17. Except for the changes in the design of the disengager included in the disengaging hopper 17, for the incorporation of features essential to the new apparatus, and the carrying out of the method of the invention, the return of the disengaged catalyst to the catalyst surge bed 16 in the bottom of the hopper 17 completes one cycle in the recirculation in the catalytic hydrocarbon conversion system. Additional details of such a cycle in such a conversion system can be developed from the article referred to above in "Petroleum Refiner" and in an article entitled "Houdriflow: New Design in Catalytic Cracking," in the January 13, 1949, "Oil and Gas Journal" at page 78, and in part also in "The 'T. C. C.' Catalytic Cracking Process for Motor Gasoline Production" by R. H. Newton, G. S. Dunham and T. P. Simpson, in "Transactions of the American Institute of Chemical Engineers," volume 41, page 215, April 25, 1945, and in articles cited in it.

Reverting now to the disengager 17 of Figure 2, the solids-fluid mixture 29 emerging from the exit end 27 of the gas lift pipe 26 continues upwardly, under the momentum imparted to it by the lift gas, toward the top of the disengager 17 in an outwardly flaring form with its outermost bounds at least usually at an angle of about seven degrees with the axis of the rising stream, until their momentum is dissipated, whereupon they shower downwardly as an open umbrella of granular solids falling under the pull of gravity. Those solids that have moved higher than the others and closer to the periphery of the disengaging vessel, on reversing their direction and starting to fall accumulate in a layer 32 on top of the falling-solids-stopping surface or shelf 33 until there are so many held on it that the angle of the downward slope of the pile is just greater than the angle of repose of the solids so that additional solids coming to that falling-solids-interrupting shelf will roll down and fall over the restraining lip or rim 34. The solids falling from shelf 33 drop to the next lower solids-interrupting shelf or surface 35 and accumulate on top of it in a layer 36 behind the retaining rim 37 together with additional solids falling from the stream 29 and which did not travel outwardly far enough, or upwardly high enough, to be intercepted by shelf 33. Because of the greater width of shelf 35 (from its retaining rim 37 to the disengager wall) than that of shelf 33, layer 36 of solids accumulates to a greater depth than layer 32 on shelf 33. Then when so many solids have accumulated on shelf 35 that the downward slope of pile 36 is at least greater than the angle of repose of the solids, further solids coming to pile 36 on shelf 35 will be momentarily interrupted, lose substantially all of their arrival velocity, roll down the pile and fall over the restraining rim 37. These latter solids drop to the next lower falling-solids-interrupting surface or shelf 40 together with other solids falling from stream 29, and which did not travel upwardly high enough, or outwardly far enough, to be intercepted on either of the two higher shelves or interrupting-surfaces 33 and 35.

Similarly, pile or layer 41 accumulates on shelf 40 until the slope of the pile exceeds the angle of repose of the granular solids when they roll down over the restraining rim 42, out of the path of the rising stream 29, to the bottom of the disengaging zone (the top of the surge bed 16) and thereby complete a cycle. The lift gas leaves through its discharge line 43. The detaining shelves 33, 35 and 40 are made of such width that a line drawn through the intersection of the top edges of their restraining rims and a plane through the axis of stream 29 is usually at an angle of about ten degrees with the axis of the stream 29 emerging from the lift. Thereby the granular solids rolling off the horizontal shelves 33, 35 and 40 at least usually fall outside the path of the rising stream 29, that is to say at least generally within the average of the operating conditions hereinabove mentioned in relation to combined thermal and catalytic cracking of petroleum employing typical catalyst within the range of sizes discussed further below.

After the completion of a cycle in the manner outlined as to the modification illustrated in Figures 1, 2, and 3, the granular solids start out on the downpass of another cycle on flowing down by gravity into and through the reactor seal leg 18.

The procedure and operation with the modification shown in Figures 4 and 5 fundamentally is similar to that described in relation to Figures 1, 2 and 3, with the essential distinction in the fact that the falling-solids-interrupting surfaces or shelves are inclined alternately toward the emerging stream, and away from it. Thus, referring to Figure 4, while lift 26 can have the same diameter up to its discharge end 27, in this particular modification it terminates in an upwardly flared portion 45, which in this case at least is located entirely within the disengager.

The solids-gas mixture stream 29 discharging from the exit end 27 of the lift will spread at least in the earlier portion of its rise so that its outer bounds form an angle of about seven degrees or more to its axis. The solids rise until their momentum is spent and then shower down like an open umbrella of solids falling under the pull of gravity. Those that have been moved to the highest level and closest to the periphery of disengager 17, after reversing their direction are temporarily arrested in their fall by landing on the inwardly inclined highest falling-solids-interrupting surface 46 and roll down its incline to its restraining rim 47 and accumulate backwardly from it in a comparatively thin layer. When the inclination of the surface 46 is too high the restraining rim 47 alone may not be effective to hold enough solids on surface 46 to cover it entirely for in many operations it is advantageous to have such steep inclination. Then one or more restraining ridges, similar, and preferably parallel, to rim 47, can be spaced away from it, and from one another when a plurality is used, across the front to rear width of the surface 46, quite similar, as it were, to a chicken ladder, to hold enough solids along surface 46 to provide a layer that covers it. When the slope of the outermost surface of the layer of solids is greater than their angle of repose, the further rain of solids falling on it will be temporarily stopped, lose substantially the entire downward velocity acquired to that point, and roll down and fall over rim 47 to the inwardly extending next lower falling-solids-interrupting surface 49.

As seen in Figure 4, the inclination of surface 49 is opposite that of the interrupter 46. Then the solids coming from the latter and others falling from the stream and which did not travel high enough, and outwardly far enough, to be detained by surface 46, roll downwardly along detainer 49 toward the side wall of the disengager 17. Part of these are held back by the disengager wall and accumulate as a layer covering at least a large part of surface 49. Others spill down through the apertures 51. Just as described with respect to detaining surface 46, so also with surface 49 if its inclination is too great to allow a layer of solids to build up over its entire surface, to accomplish that in any particular installation, additional retaining ridges, concentric with its innermost edge, can be suitably spaced along surface 49 for that purpose. So also, when the slope of the topmost surface of that layer of solids is greater than its angle of repose, solids from it and coming to it, after being stopped momentarily and thus losing their that far attained velocity, roll down toward the disengager wall and spill down through the downflow apertures 51 to the highest portion of the next below detaining surface 52.

Other solids disengaged from solids-gas mixture stream 29, usually located further from its axis and nearer to its peripheral layers, and which did not rise high enough, or move outwardly enough, to reach detaining surfaces 46 and 49, land also on interrupting surface 52 and pile up behind its restraining rim 53 and build up over the inclined surface 52, with the solids spilled over through apertures 51 and rolling down it, a layer that at least in some operations may cover the entire surface 52. Where that does not occur and is desired, supplementary, concentrically spaced apart restraining ridges can be included over its surface, just as described as to surfaces 46 and 49. Here again, when the slope of the topmost surface of that layer of solids is greater than their angle of repose, solids from it and dropping onto it from stream 29, after being stopped momentarily and losing attained velocity, roll down to and over restraining rim 53 and drop onto falling-solids-detaining surface 55. These solids are joined on it by solids from the emerging stream 29, in manner described for the higher interrupting surfaces, and the same occurs on this level as did at detaining surface 49. Here also supplementary, concentrically spaced apart restraining ridges can be used to the extent indicated in any particular installation to assure a covering layer of solids over the entire interrupting surface 55 which also can have a restraining rim 56. The solids then run down over this surface layer toward the side wall of the disengager and spill down through the apertures 57 to the catalyst surge bed 15.

The lift gas free of solids leaves through its outlet 43. Thus, a cycle is completed and is then repeated as part of the continuous circulation, just as noted in relation to Figures 2 and 3.

There is no restriction to the outline, number, and distribution of the apertures 51 and 57 in the detaining surfaces 49 and 55 respectively, for those can be varied in accordance with the planned operating features of a particular installation. The same applies to the selection of the inclination of the surfaces 46, 49, 52, and 55, as well as to the omission or inclusion of the restraining ridges and their number and placement, and even as to their being complete circles or merely a series of arcs or of other form. So also, the type of installation planned can control the selection of the height of the restraining rims, or, in fact, whether even to omit them.

In the embodiment of Figures 6 and 7, there are combined features of a method and apparatus for cutting down attrition on discrete solids of the type concerned at least in part by cutting down the overall height of rise of the solids-gas stream emerging from the lift with the method and apparatus embraced in the instant invention for doing so by one or more times interrupting or breaking the otherwise free fall of the granular solids following their disengagement from the lift gas.

In Figures 6 and 7, the solids-gas mixture stream discharges into the bottom of disengager 17 and rises past the exit end 60 of the half of lift pipe 26 inward of a plane drawn through the axis of the lift pipe and perpendicular to the sheet of the drawing. Extension 61 of the lift pipe 26 extends nearly to the tophead of the disengager and conveniently serves as part of that end wall of it. Diverting fluid or gas streams, of any suitable composition compatible with the lift gas and the catalyst are fed through diverting fluid lines 64. These open into disengaging zone 66 at their intersection with the lift extension 61. There through diverting gas outlets or nozzles 63, diverting gas is blown against the emerging stream of solids-gas mixture rising in front of them and along extension 61 and diverts the mixture stream away from its normally directly upward course and toward the falling-solids-interrupting or -detaining surfaces 68, 69, 70, and 71. Through another diverting fluid or gas inlet 72 inclined downwardly toward the axis of the mixture stream, another stream of diverting gas blows against the highest rising portion of the mixture stream and likewise diverts it from its normally upward course and toward the detaining surfaces 68 to 71. The lift gas from which the solids have been separated, together with diverting gas, leave by the gas exit line 73. The force of the diverting streams does not have to be great for they are directed against individual solids substantially relieved of the impetus of the lift gas and do not have to overcome the force of gravity.

The portion of the solids-gas mixture which has the highest velocity on its emergence from the lift will rise higher, and be diverted by diversion gas farther, than other emerging from the lift. These highest rising solids, on losing their upward momentum, fall on the outwardly (from the location of the lift) downwardly sloping falling-solids-detaining surface 68 and roll down it and drop only a very short distance from it to the topmost inwardly downwardly sloping detaining surface 75 and then roll down it and drop another very short distance to the next lower outwardly downwardly sloping detaining surface 69. The portion of the solids-gas mixture nearest the inside surface of the lift pipe will have the lowest velocity and on its emergence its solids will rise the shortest distance. On being disengaged, some of them will fall directly to, and roll down, the bottom of the disengager, and part of them could drop to the detaining surface 71. The intermediate portions of the lift stream will reach intermediate heights, some of their solids reaching the interrupting surface 69 and rolling down it ond joining the solids that dropped from surface 75 and together with them dropping the short distance to the detaining surface 76 and then rolling down it and dropping from it to interrupting surface 70. Other intermediate distance rising solids will fall onto the surface 70 and roll down it and join the solids that dropped onto it from detainer 76 and together with them drop the short distance to the interrupter 77. These solids then drop to surface 71 and there join the solids that originally landed on, and rolled down, it and together wtih them drop to the bottom of the disengaging zone 66. A cycle is thus completed and the solids are available to go through another, as described in relation to the other embodiments, by starting on the downpass through the reactor seal leg 18.

The direction of the diversion gas inlet 72 can be varied from directly opposite that of the stream emerging from the lift through any oblique angle to normal, or at a higher oblique angle, to the mixture stream. At least usually it is preferably inclined inwardly downwardly at an angle between about thirty to about sixty degrees to the lift axis. While shown in Figures 6 and 7 as used auxiliary to four other diversion lines, it may be used with a greater or lesser number of them or merely alone. So also the other diversion gas feed lines 64 may be used in a greater or lesser number without the line 72, and need not always be normal to the lift axis. In any of these variations, the lift extension 61 may be omitted if it is advantageous to do so.

By a non-vertical falling-solids-interrupting or -detaining surface, as to any of the embodiments, is meant one that can be horizontal as in Figures 2 and 3, or inclined in one direction or another as in Figures 4 and 6, so long as the inclination of the surface is not so great that the solids reaching it will merely touch it and then glance off without significant loss in velocity of fall. It is advantageous to design the interrupting surfaces of such width that the rising emerging stream from the lift will miss the innermost edges of the detaining surfaces and that solids falling off the innermost edges of them will miss the rising stream of solids.

While in each of the illustrated embodiments the solids interrupting surfaces or trays are shown above the level of the top of the lift, it will be understood that additional trays or other fall interrupting devices may be included in the disengager at lower levels, particularly in those installations wherein there would otherwise be a damagingly great distance of free fall from the tray at or just above the top of the lift to the surface of the bed below.

While the restraining or retaining rims of the interrupting surface, as shown in the modifications of Figures 2 and 5, are not critical, they are advantageous, for an accumulated layer of solids affords less damage resulting from impact by the fact that the solids in the layer will yield when fresh solids drop on it, than a rigid continuous surface.

The method and apparatus of the invention need not be confined to a disengager serving only a single pneumatic lift as shown in the drawings, but are also applicable to a disengager serving a number of lifts, and are not restricted to the shape of disengagers seen in the drawings.

The method and apparatus of the invention are especially advantageously applicable to handling granular solids or pellets of at least all held on a sixty mesh screen or larger, and often of the order of all held on a fourteen mesh screen and somewhat larger. They can be coarse and irregular granules but are preferably of uniform shape such as molded cylindrical pellets or spheroidal beads, such as the typical siliceous petroleum cracking catalyst commercially used in the non-turbulent bed methods. Their diameter or largest dimension can be at least about 1 mm. and up to say 15 mm., and preferably between 2 and 8 mm. and advantageously between about 2 and 5 mm.

While the invention has been described by certain specific embodiments of it, it is understood that many substitutions and variations may be made in it within the range of the appending claims that are intended also to cover equivalents of the illustrative embodiments.

This application is a division of application Serial No. 231,116, filed June 12, 1951.

What is claimed is:

1. In a system wherein free-flowing, relatively frangible, granular solids are in substantially continuous circulation, comprising movement of the solids downwardly in a continuous stream along a downflow pass and their elevation through a confined upflow pass by momentum imparted to them by a fluid stream flowing vertically through said upflow pass at a velocity great enough to raise the solids in a continuous stream through the upflow pass, whereby the solids after leaving the upflow pass rise to a considerable height above the discharge end of the upflow pass, into an enclosed disengaging zone of greater horizontal cross-section than that of the confined upflow pass, until the momentum imparted to them is dissipated, and would then drop in uninterrupted, free fall to a level below that of the discharge end of the upflow pass and thereby cause significant attrition damage to the solids by their impact, at the velocity developed by them over the extent of their drop, against solids already on the bottom of the disengaging zone, the method of effectively reducing the maximum free fall velocity attainable by the descending granular solids by the end of their drop after disengagement from the lift fluid and thereby effectively reducing the force of their impact against the disengager bottom or other solids already on it and likewise reducing the possibility of attrition damage, which method comprises intercepting the free-falling solids by an interposed surface at each of a plurality of levels within said disengaging zone and in a plurality of areas closely adjacent to the envelope of the upwardly moving and gradually widening stream of solids discharged from said lift pass, the nearest edge of each such surface being laterally spaced further from the vertical axis of the confined upflow pass than that of the surface therebelow so that a line intersecting said edges approximates the slope of the said envelope, maintaining intercepted solids throughout each of said areas as a supported continuous layer to provide such interposed surface at an inclination to the horizontal that solids deposited thereon roll in a generally radial direction to and over an edge of said layer, and passing said solids by free-fall from at least one edge of said layer to the surface of the layer next below, whereby said solids are intercepted at each of said levels and are passed stagewise through said plurality of intercepting levels to said level below that of the discharge end of the upflow pass at the bottom of said disengaging zone.

2. A method as claimed in claim 1, wherein a stream of gas is directed laterally at the stream of solids and lift gas emerging from the lift to divert the stream of solids in a direction away from the axis of the stream and the disengaged diverted solids are intercepted on at least one non-vertical surface positioned at that side to which the stream of solids is diverted, and inclined downwardly away from the stream.

3. A method as claimed in claim 2, wherein the disengaged granular solids are intercepted on a plurality of downwardly inclined surfaces at least one of which inclines downwardly away from the emerging stream of solids and at least one of which is farther removed from the emerging stream than the first inclined surface and inclines downwardly toward it, and the descending solids alternately roll first down a solids-intercepting surface inclined in one direction and then down such a surface inclined in the opposite direction.

No references cited.